US007006155B1

(12) United States Patent
Agarwala et al.

(10) Patent No.: US 7,006,155 B1
(45) Date of Patent: Feb. 28, 2006

(54) REAL TIME PROGRAMMABLE CHROMA KEYING WITH SHADOW GENERATION

(75) Inventors: Vinay Agarwala, San Jose, CA (US); Clement Tse, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/495,540

(22) Filed: Feb. 1, 2000

(51) Int. Cl.
*H04N 9/75* (2006.01)
(52) U.S. Cl. .................. 348/592; 348/598; 348/597
(58) Field of Classification Search ........ 348/590–599, 348/578, 584, 187, 587; 358/22; 345/634, 345/637, 639, 640, 589, 591, 592
See application file for complete search history.

(56) References Cited

U.S. PATENT DOCUMENTS 4,109,278 A * 8/1978 Mendrala et al. ........... 348/587

FOREIGN PATENT DOCUMENTS

JP 6-339150 * 12/1994

* cited by examiner

Primary Examiner—Victor R. Kostak
(74) Attorney, Agent, or Firm—Blakely Sokoloff Taylor & Zafman LLP

(57) ABSTRACT

A system for forming composite video images from one or more foreground images and one or more background images. In one embodiment, s sum of a suppressed foreground image signal with weight $\alpha$, with one or more selected foreground colors suppressed, and a background image signal with weight $1-\alpha'$ ($0 \leq \alpha' \leq 1$) is formed, where a and $\alpha'$ may vary from pixel to pixel and with time. In another embodiment, a shadow from a selected foreground image is impressed on selected pixels of a background image. In another embodiment, foreground suppression and shadowing are combined, optionally by retrofitting, using an existing $\alpha$-mixer or a newly constructed $\alpha$-mixer. Provision of a chroma key map allows a foreground image shadow to be prescribed pixel by pixel, including a transition region in which the shadowed image slowly disappears.

6 Claims, 10 Drawing Sheets

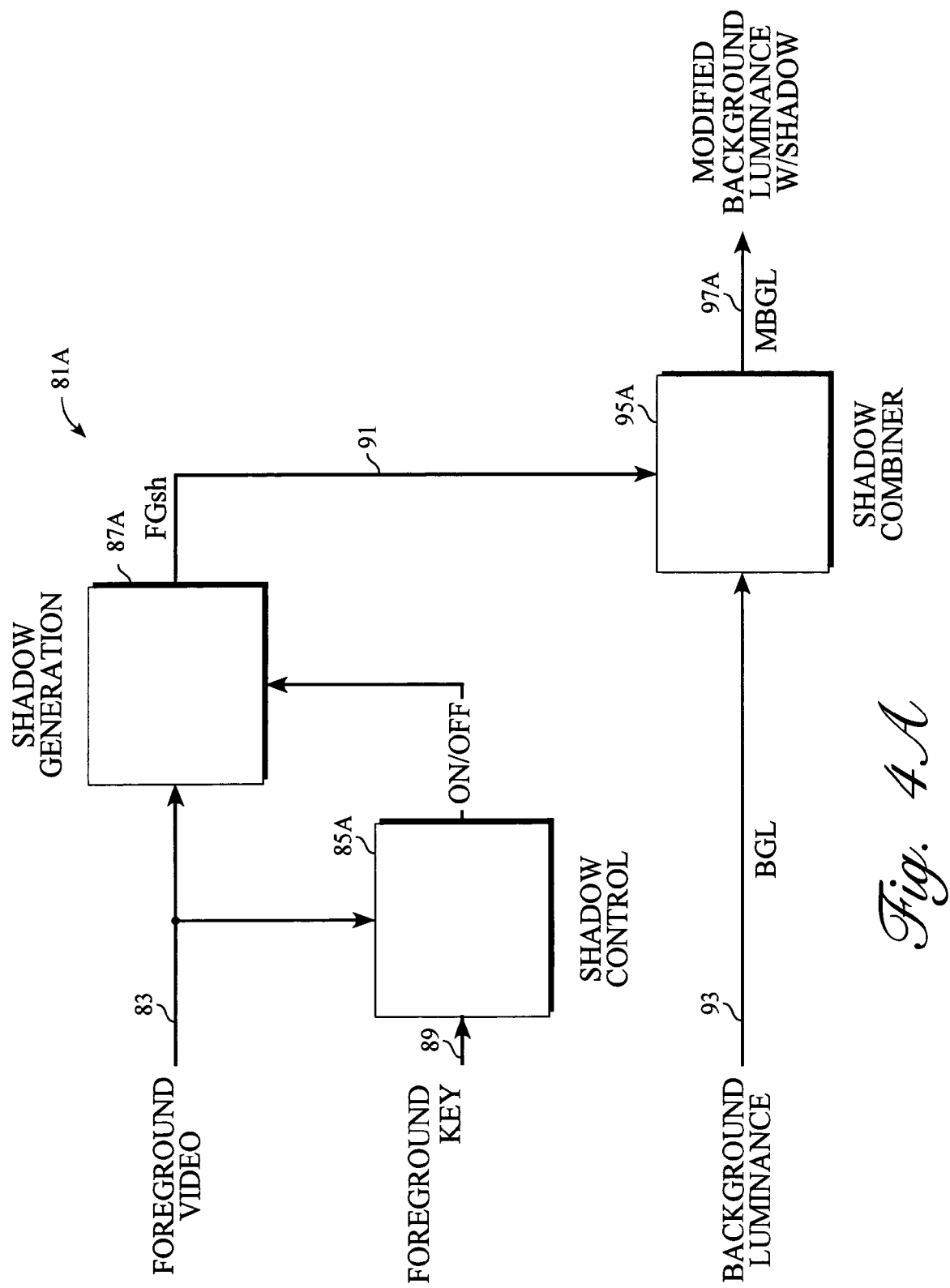

REAL TIME PROGRAMMABLE CHROMA KEYING WITH SHADOW GENERATION

FIELD OF THE INVENTION

This invention relates to presentation of television signals, using chroma keying to combine and present images.

BACKGROUND OF THE INVENTION

In formation of a television signal, several distinct views may be available for use at any time. In many instances, the broadcast controller may choose to present a single view. However, in some instances, it may be preferable to merge, combine and/or modify images from two or more views, using a process called chroma keying. A chroma key specifies, pixel by pixel, whether a portion of a foreground view or of a background view will be displayed. In chroma keying, a foreground portion of a first view or source may be combined with a background portion of a second view or source, by selectively replacing television signal data from the first source with data from the second source. When the foreground data from a particular source is captured, a selected key color is usually chosen for the (initial) background. A chroma key algorithm identifies that key color within the foreground data to determine where, or whether, to combine or merge the background data.

Several difficulties occur in implementation of chroma keying. The key color used as a backdrop may not have uniform luminance or chroma, due to physical defects in the display screen, imperfect lighting, the presence of other (nonuniform) lighting sources or reflections or shadows, and for other similar reasons. A relatively transparent foreground object will often exhibit the chroma key color and thus be undesirably replaced with a portion of the background image. The edges of a foreground image may manifest fine detail, such as wisps of hair, smoke, etc. that are easily lost using many chroma key algorithms. Color spill or infection from the chroma key color is often present adjacent to the edges (sharp or diffuse) of a foreground object and may arise from reflected key color light from the backdrop, blurring of an image due to local defocusing of the camera, motion of the camera and object relative to each other, video filtering, etc.

Originally, the chroma key was a "hard" key, within which only the foreground image or only the background image was displayed at each pixel. A "soft" chroma key has become available more recently, in which each pixel may include a first fraction of the foreground image and a second fraction of the background image. Use of soft keying allows a blending at an image edge and may provide a more natural transition between images.

FIG. 1 is a block diagram of a conventional chroma key system 11. A foreground image and a background image are received on signal lines 13 and 14, respectively, at a foreground suppression module 15 and at a background suppression module 17. A foreground key generator 19 and a background key generator 21 provide a foreground key and a background key for the foreground suppression module 15 and the background suppression module 17, respectively. The foreground suppression module 15 and the background suppression module 17 provide partially (or fully) suppressed foreground and background images that are received by an image sum module 23. The result is a chroma keyed image that may combine and issue the foreground and background images in a composite video image according to the particular keying algorithm adopted.

FIG. 2 is a block diagram of an existing alpha mixer system 31. A foreground video signal FG and alpha signal $\alpha(0 \leq \alpha \leq 1)$ are received on input signal lines 33 and 35, respectively, and are multiplied to form a first product, $\alpha \cdot FG$, in a first multiplier module 37. A background video signal BG is received on a third input signal line 39, an α-complement, $1-\alpha$, is formed in a complement module 41, and a second product, $(1-\alpha) \cdot BG$, is formed in a second multiplier module 43. A sum of the first product and the second product is formed in a sum module 45, and the resulting mixed video signal, $\alpha \cdot FG + (1-\alpha) \cdot BG$, is issued as an output signal on an output line 47.

What is needed is a soft chroma keying approach in which one or more foreground images can be combined with one or more shadowed background images in a programmable approach that allows the relative strength of each image to vary, pixel by pixel, with time across the display screen. Preferably, the sum of the strengths of the contributing images should not be required to add to 1.0. Preferably, the distribution of chroma key values over a color plane (a "key map") should be expressible as a mapping between selected foreground location on the color plane and corresponding n-tuple representing the chroma key values for each pixel.

SUMMARY OF THE INVENTION

These needs are met by the invention, which provides a simplified approach for generation of chroma key, alpha mix value and shadow generation that reduces memory requirements, substantially reduces the number of multiplication and division operations for the numerical computations, preserves real time analysis and graphical display, and provides natural, acceptable visual images.

In one embodiment, s sum of a suppressed foreground image with weight α, with one or more selected foreground colors suppressed, and a background image with weight $1-\alpha(0 \leq \alpha < 1)$ is formed, where a may vary from pixel to pixel and with time. In another embodiment, a shadow from a selected foreground image is impressed on selected pixels of a background image. In another embodiment, foreground suppression and shadowing are combined. Optionally the new system may be formed by retrofitting, using an existing α-mixer, or the system can be constructed from components.

DESCRIPTION OF BEST MODE OF THE INVENTION

Figure 1:
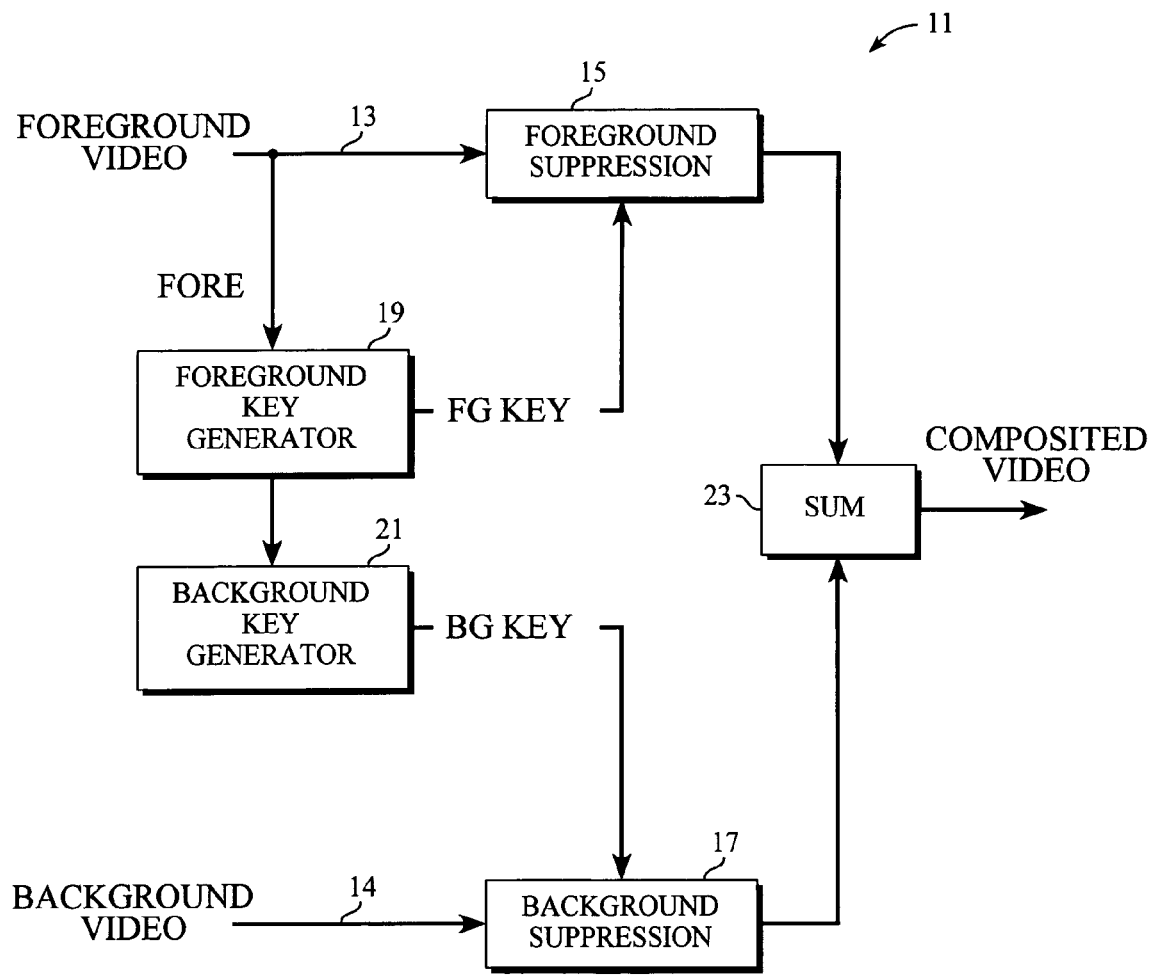
FIGS. 1 and 2 are block diagrams of a conventional chroma key system and an existing alpha key mixer system, respectively.
Figure 2:
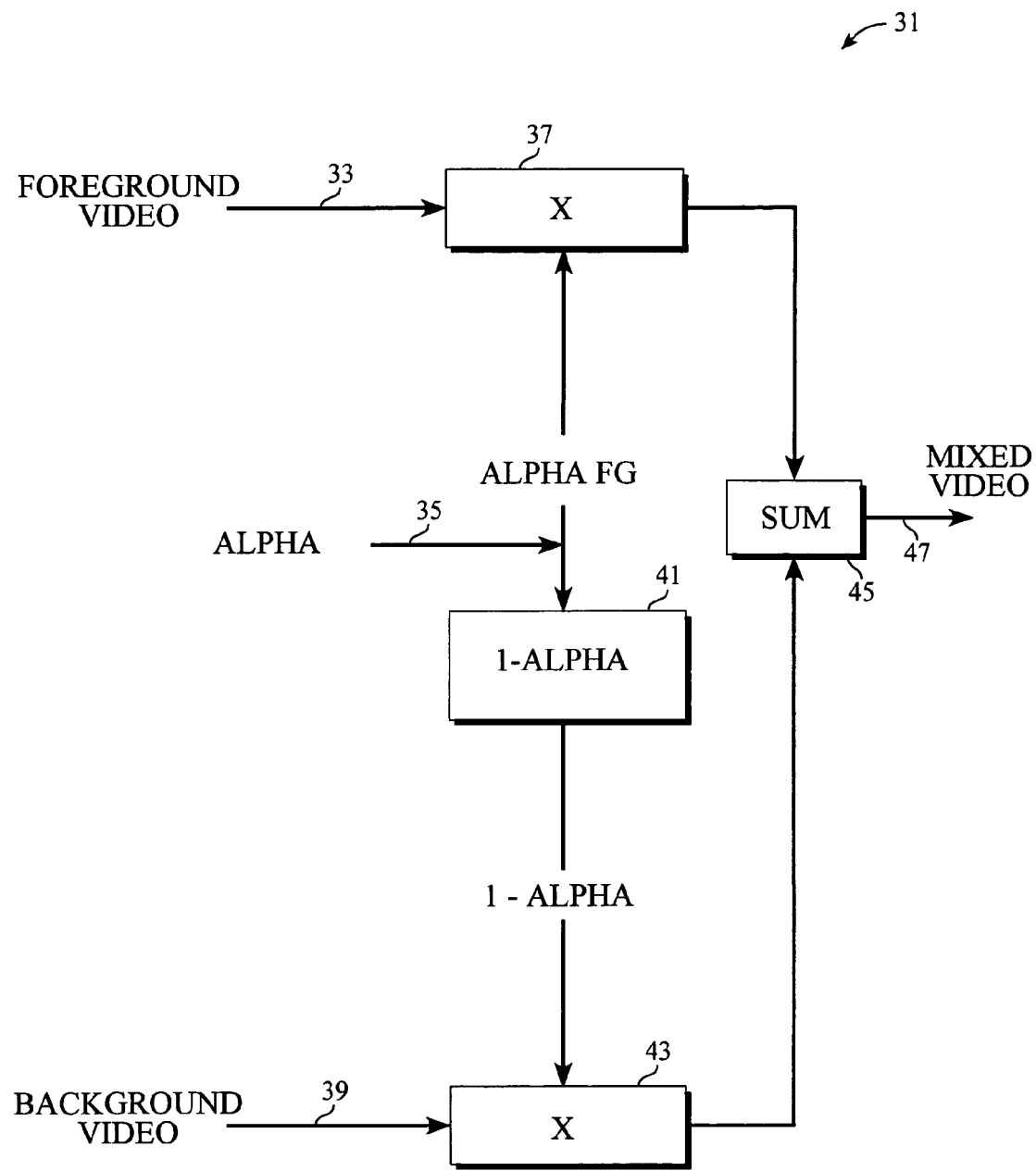

In a conventional approach to alpha mixing, as illustrated in FIG. 2, a resulting or composite image is a convex sum of a foreground image, with associated weighting a, and a background image, with weighting 1−α.

Figure 3:
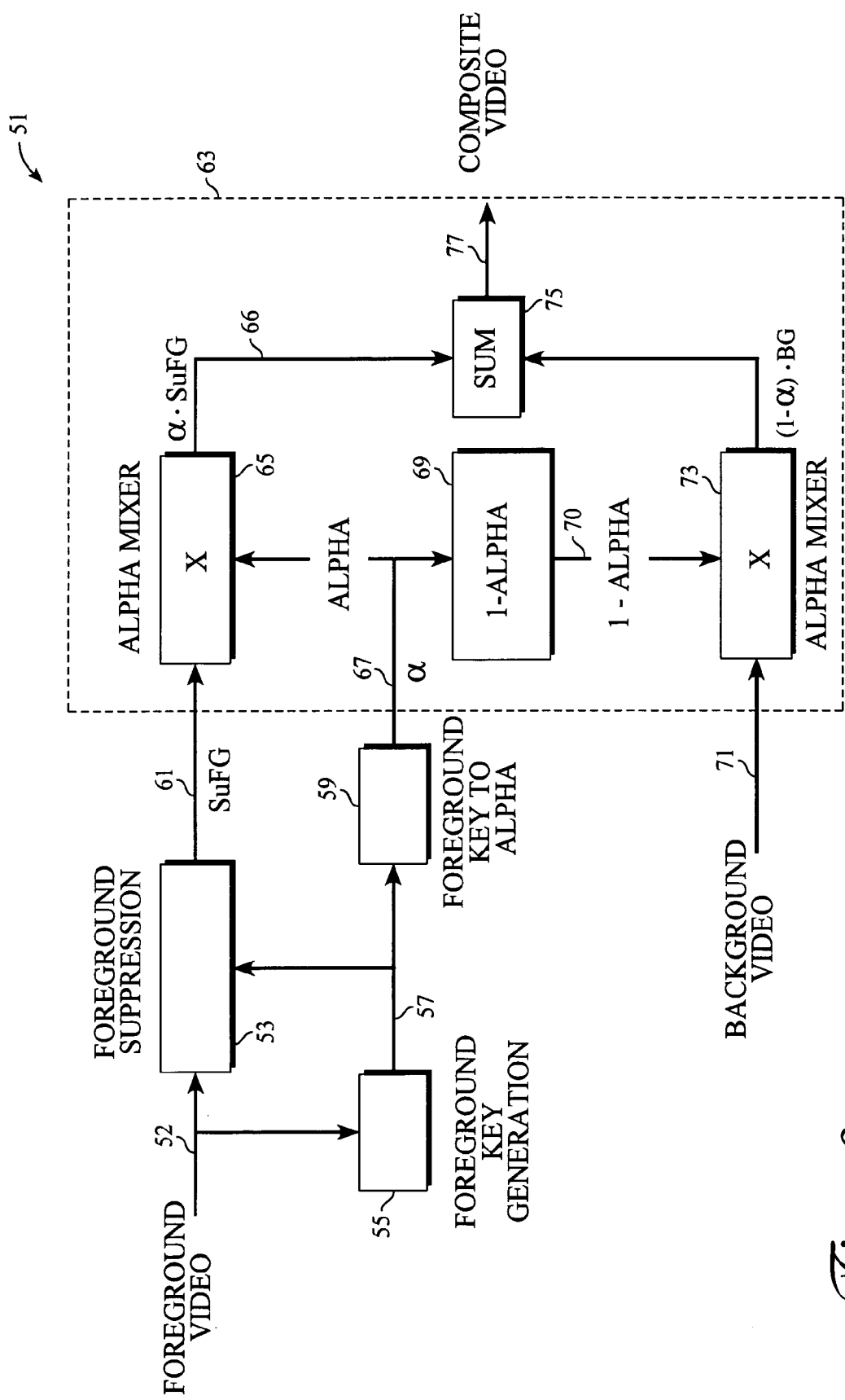
FIG. 3 is a block diagram of a chroma key system using an existing alpha mixer according to the invention.

FIG. 3 illustrates a system 51 that allows use of combinations of foreground and background images, where the sum of the weighting coefficients may be greater than, equal to or less than 1 for any pixel. A foreground video image is received on a first input signal line 52, at a foreground suppression module 53 and at a foreground key generation module 55. The foreground key generation module 55 issues a soft foreground key signal on a first intermediate signal line 57 that is received by the foreground suppression module 53 and by a foreground key to a module 59.

The foreground suppression module 53 receives the two input signals and issues a suppressed foreground video signal SuFG on a second intermediate signal line 61 that is received by a foreground image product module 65 that is part of a standard alpha mixer sub-system 63, similar to the sub-system shown in FIG. 2. For any pixel or group of pixels, the suppressed foreground signal SuFG received on the second intermediate signal line 61 may have an associated color vector amplitude for any pixel that is different from the distance from the color plane origin to the location of the original foreground color in the color plane. The foreground image product module 65 also receives an alpha value signal, α=α(FG), issued by the foreground key to α module 59 on a third intermediate signal line 67, and forms and issues a first product, α·SuFG, of the α value and the suppressed foreground video signal on a signal line 66 that is received by a first input terminal of a sum module 77.

A background video signal BG is received on a second input signal line 71 by a background image product module 73. The α-key signal issued by the α-key module 59 is also received by an α-complement module 69, which forms and issues an α-complement value, 1−α, on a signal line 70. The α-complement signal is also received by the background image product module 73. The background image product module 73 forms and issues a second product, (1−α)·BG, which is received by the sum module 75. The sum module 75 forms and issues a composite sum signal, α·SuFG+(1−α)·BG, on an output signal line 77. An existing alpha mixer sub-system 63 may be retrofitted with the remainder of the components shown in FIG. 3, or the entire system 51 can be constructed initially.

More generally, the sum module 75 may form and issue a suppressed foreground composite image signal, α·SuFG+ (1−α')·BG, where α and α' are selected real numbers lying in a range between 0 and 1. Where the suppressed foreground image intensity is to be limited by the background image intensity for a given pixel, the constraint 0≦α'≦α≦1 can be imposed. Where the background image intensity is to be limited by the suppressed foreground image intensity for a given pixel, the constraint 0≦α≦α'≦1 can be imposed.

A foreground key and associated key map can vary the suppressed foreground video signal SuFG from 0 percent to 100 percent in selected increments, for any pixel. Preferably, this suppression key is generated automatically.

Foreground suppression can eliminate all evidence of a selected key color from the foreground video image, before the (modified) foreground video image is mixed with the background video image. Without application of foreground suppression, a region of chroma spill on the foreground image will become very noticeable in a composite image.

Normally, insufficient information is available to correctly replace all of the key color spill with the true colors that would be available in a neutral background. One goal of foreground suppression is to create a natural looking foreground image that does not contain the key color. The mapping between the foreground points of the color plane and the post-suppression points on the color plane is central to the quality of the suppression key. On a key generation map, every chroma point has an associated key value. On the suppression map, by contrast, every chroma point has an associated vector (or mapping) that points to or indicates the resulting chroma point after suppression is implemented.

FIG. 4A illustrates a conventional shadow generation system 81A that can be used to generate a background image having a "shadow" that is determined with reference to a foreground image. A foreground video image is received on a first input signal line 83 at a shadow control module 85A and at a shadow generation module 87A. The shadow control module 85A receives a foreground key signal on a second input signal line 89, analyzes the foreground key signal, and issues a pixel-by-pixel binary or on/off shadow control signal that is received by the shadow generation module 87A. The shadow generation module 87A forms and issues a foreground shadow signal FGSh, in which each selected foreground pixel appears in a shadow format, on an intermediate signal line 91, which is received by a shadow multiplier module 95A. A background luminance signal BGL is also received on a third input signal line 93 at the shadow multiplier module 95A, and a modified background luminance signal MBGL, with the foreground shadow imposed on selected pixels, is formed and issued on an output signal line 97A.

Figure 4B:
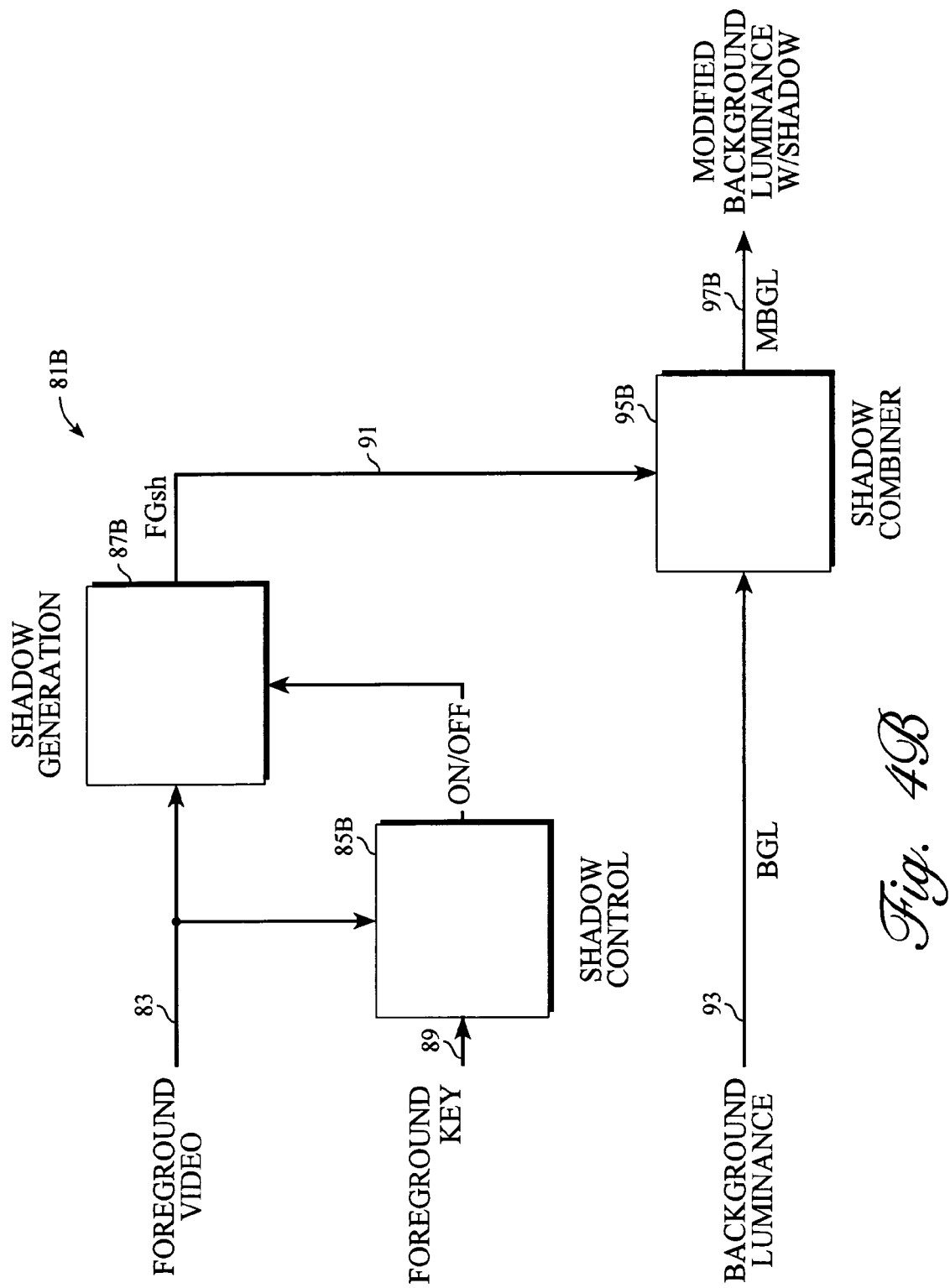
FIGS. 4A(prior art) and 4B are block diagrams of systems for shadow generation that scales background luminance.

FIG. 4B illustrates a shadow generation system 81B that can be used to generate a background image having a shadow, determined with reference to a foreground image, according to an embodiment of the invention. The shadow control module 85B and shadow generation module 87B in FIG. 4B are similar to the corresponding components shown in FIG. 4A. The conventional multiplier module 95A in FIG. 4A is replaced in FIG. 4B by a combiner module 95B that uses summation rather than multiplication, together with the background luminance signal, to form and issue a modified background luminance signal MGBL' with shadowing on the output signal line 97B.

One method of impressing a foreground shadow onto a background image is to replace the "shadowed" portions of the background image by a sum, β·FGSh+(1−β')·BG, of the background image BG and the foreground shadow image FGSh, where β and β' are two selected real numbers satisfying 0≦β≦β'≦1. This approach ensures that the portion of the background image BG that is overlain by the foreground shadow image FGSh has a shadowed background image intensity that is limited by the associated foreground image shadow intensity (0≦1−β'≦1−β). As a first alternative, one can select the numbers b and b' to satisfy 0≦β≦β'≦1 so that the associated foreground image shadow intensity is limited by the background image intensity. As a second alternative, one can choose β=β' for the selective shadowing of background by foreground. The value of β and/or β' may be chosen independently of, or to reflect a numerical relationship to, the alpha values α and/or α' used in the discussion of FIG. 3.

Where the key color background is approximately uniformly lit, shadows from objects in the foreground may be visible. When these patterns of luminance attenuation are transferred to the background image, it should appear that the foreground objects have cast their shadows on the background images. Where the luminance attenuation is done correctly, the realism of the composite image is enhanced. This same process can be used for translucent and/or transparent images, for example, where a background image is viewed through a foreground image such as fine hair or mist or a partially transparent window pane. Preferably, shadow generation is performed in real time, as each composite image is formed.

Figure 5:
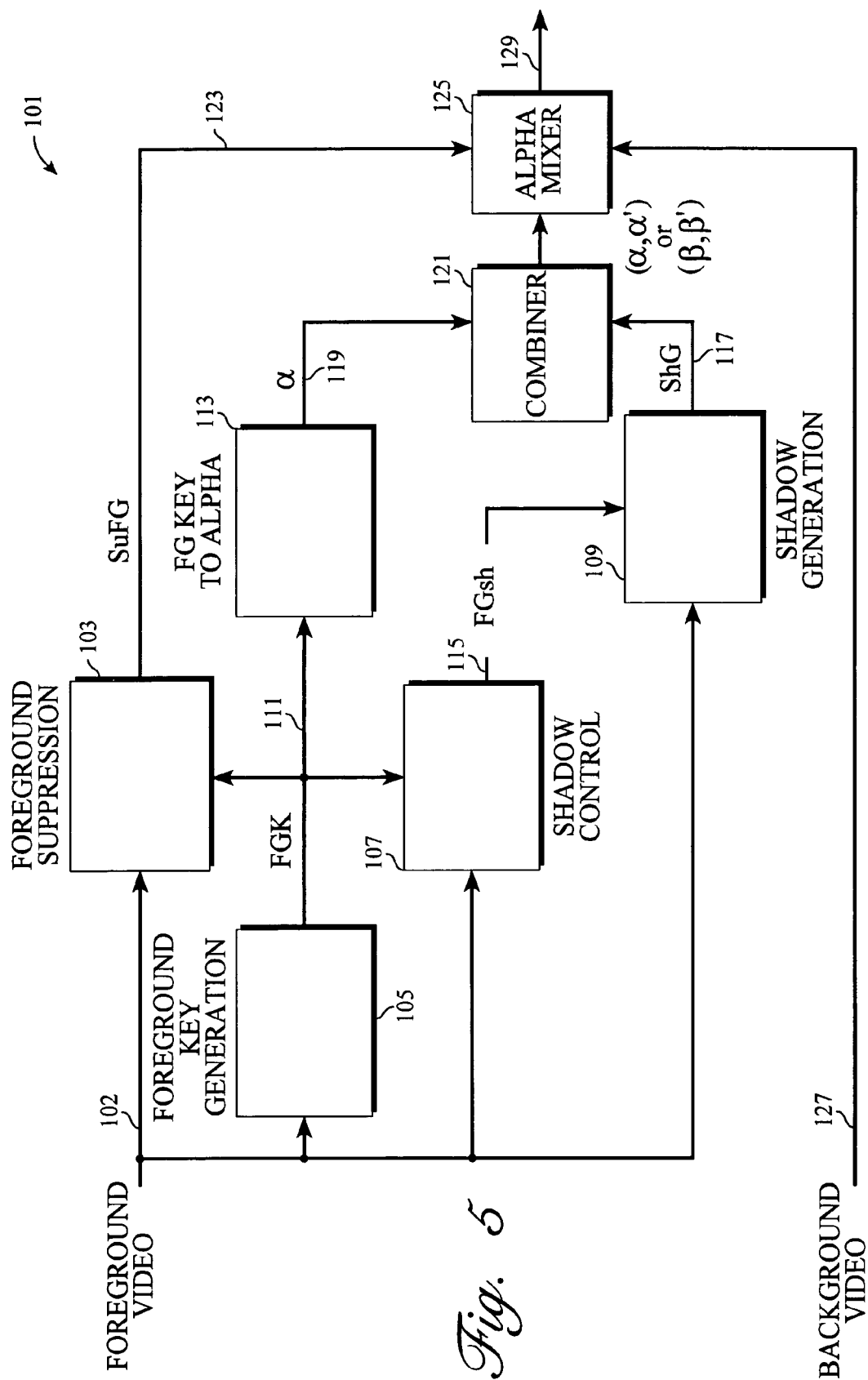
FIG. 5 is a block diagram of a system for combined foreground suppression and shadow generation using an existing alpha mixer and associated alpha values according to the invention.

FIG. 5 is a block diagram of a system 101 for shadow generation and the chroma key algorithm discussed in the preceding, using an existing or specially constructed alpha mixer sub-system, to provide a composite image with suppressed foreground and foreground image shadowing of selected background objects. A foreground video signal is received on a first input signal line 102 at a foreground suppression module 103, at a foreground key generation module 105, at a shadow control module 107 and at a shadow generation module 109. The foreground key generation module 105 generates and issues a foreground key signal FGK on a first intermediate signal line 111, and the signal FGK is received at the foreground suppression module 103, at the shadow control module 107 and at a foreground key to alpha module 113. The shadow control module 107 generates and issues a foreground shadow control signal FGSh, on a second intermediate signal line 115, that is received by the shadow generation module 109. The shadow generation module 109 generates and issues a shadow generation signal ShG on a third intermediate signal line 117, which signal is received at a combiner module 121.

The combiner module 121 takes account of the shadowing of selected pixels in a shadowed background image by the foreground image for the corresponding pixels, in generating a modified alpha key, denoted as β; where no shadowing is present, β=α for this portion of a composite image; where shadowing is present, the formalism developed in the discussion of FIG. 4B is applied, and the shadowed portion of the background image BG is replaced by a modified background luminance signal, MBGL'=β·FGSh+(1−β')·BG, where β and β' are selected real numbers in the range [0,1].

The foreground key to alpha module 113 generates and issues a foreground key to alpha signal FGKA on a fourth intermediate signal line 119 that is also received by the combiner module 121. The combiner module 121 generates and issues an alpha signal pair (α,α') and/or a modified alpha signal pair (β,β'), with pair values that take account of the shadow, if any, to be generated for each pixel and the composite image of foreground image and background image that is ultimately to be formed. In some simple situations, the pair (α,α') or (β,β') reduces to a single value, such as β or β, that is received and processed by an alpha mixer module 125.

The foreground suppression module 103 generates and issues a suppressed foreground signal SuFG on a fifth intermediate signal line 123 that is received by an alpha mixer module 125. The alpha mixer module 125 also receives a background video signal on a second input signal line 127 and forms and issues a composite signal, α·SuFG+(1−α')·BG (no shadow) or α·SuFG+(1−α')·MBGL (with shadowing), an output signal line 129.

Alternatively, the combiner module 121 and the alpha mixer module 125 can work cooperatively to provide a compensated alpha value, α" with 0≦α"≦α, and form and issue a composite signal α"·SuFG+(1−α")·BG on the output signal line 129. This alternative approach is appropriate, for example, where an existing alpha mixer is to be reused, or retrofitted for use with, the present invention. The alpha mixer module 125 can be reused, with many or all of the other components shown in FIG. 5 being retrofitted, or the system 101 shown in FIG. 5 can be constructed from available and newly designed components.

One advantage of the invention is the flexibility of the key map, which is programmable pixel-by-pixel if desired. Any key color can be chosen and any distribution of the key map can be used. If a user determines that a different contour and/or different color range for the key map is more desirable, the system can be reprogrammed to accommodate this change. The key map may, for example, be programmed for a specific distribution of colors within a particular sequence of video images.

The invention minimizes much of the hardware complexity of chroma keying, by eliminating many of the multiply and divide operations associated with the chroma key calculations. The invention allows re-use of an already-available alpha mixer. By incorporating the requirement that the chroma key map is non-zero only within a reasonably bounded region, which is relocatable, the memory required to store the key map is reduced substantially. By incorporating the assumption that the chroma key values will be continuous and will not have associated high spatial frequencies within the bounded region, aggressive sub-sampling of the bounded region further reduces the memory requirements. The foreground suppression module (103 in FIG. 5) re-uses the key map data, rather than requiring allocation of additional memory for storing the suppression vector map. The key map data are also used to construct the alpha values for the video alpha mixer. The invention generates alpha values from the chroma key signal and independently generates color vectors corresponding to the chroma key signal, which offers greater control of the level of foreground suppression, independent of alpha mixer operation.

Shadow generation according to the invention is a substantial departure from conventional shadow generation. According to the invention, a shadow that is visible on the composite image is related to, but is not necessarily proportional to, the shadow on the underlying foreground image. A luminance difference value, rather than a luminance ratio, is used in the shadow algorithm. This new approach maintains subtle shadings but reduces the complexity of the computations. The strength of a shadow in the conventional approach and in the invention are generally not the same, but the shadows appear natural in both approaches.

The shadow information is incorporated into the alpha value, not into the background luminance or into the final composite image as is usually done in conventional approaches. A shadow is generated on the final composite image by modifying the alpha value to mix in more black (and/or remove more of the foreground color). This modification eliminates many of the multiply operations that are normally required by a conventional shadow algorithm, allowing use of (only) the alpha mixer.

Figure 6:
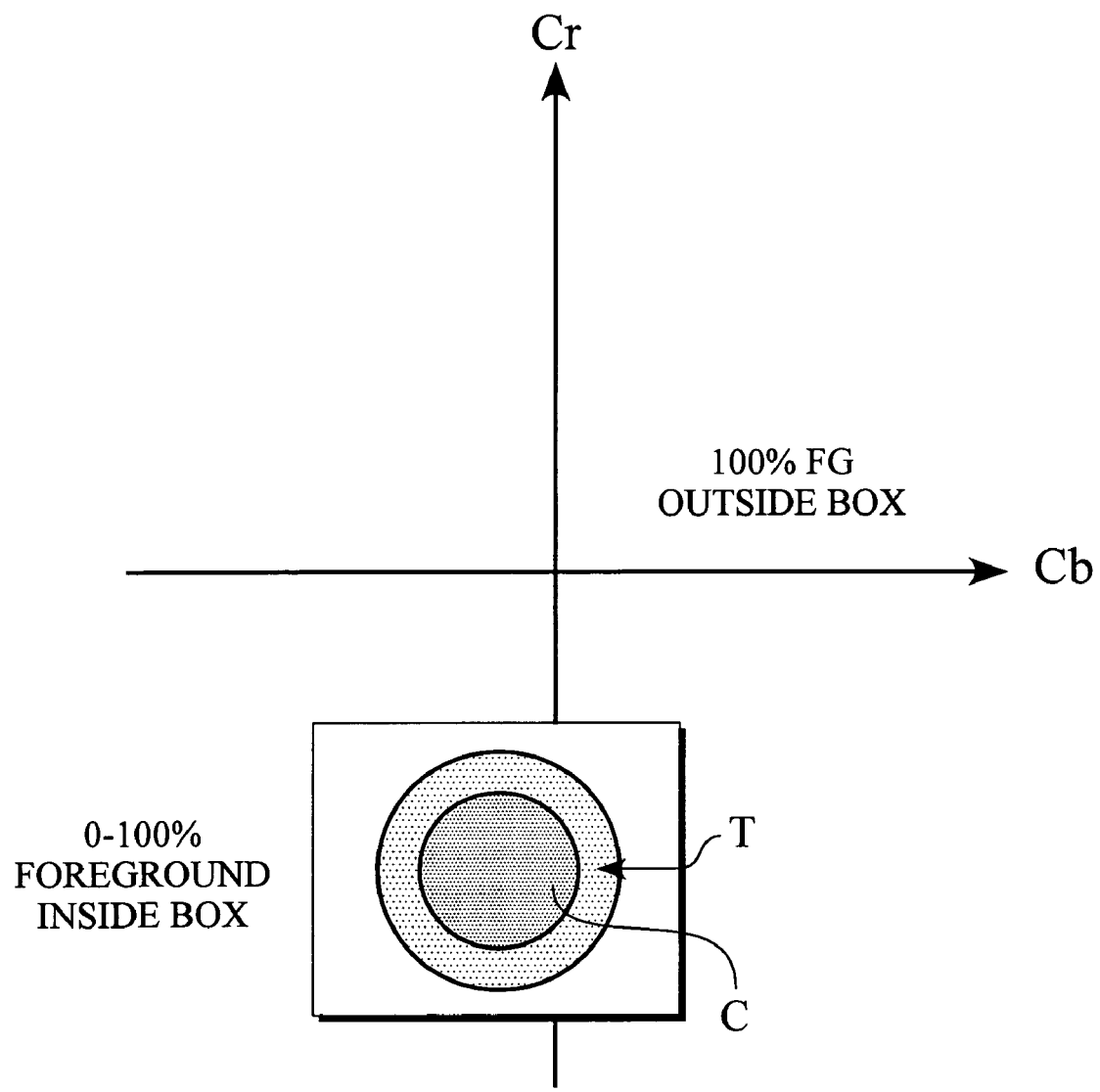
FIGS. 6 and 7 are an example of a chroma key map that can be prescribed according to the invention.
Figure 7:
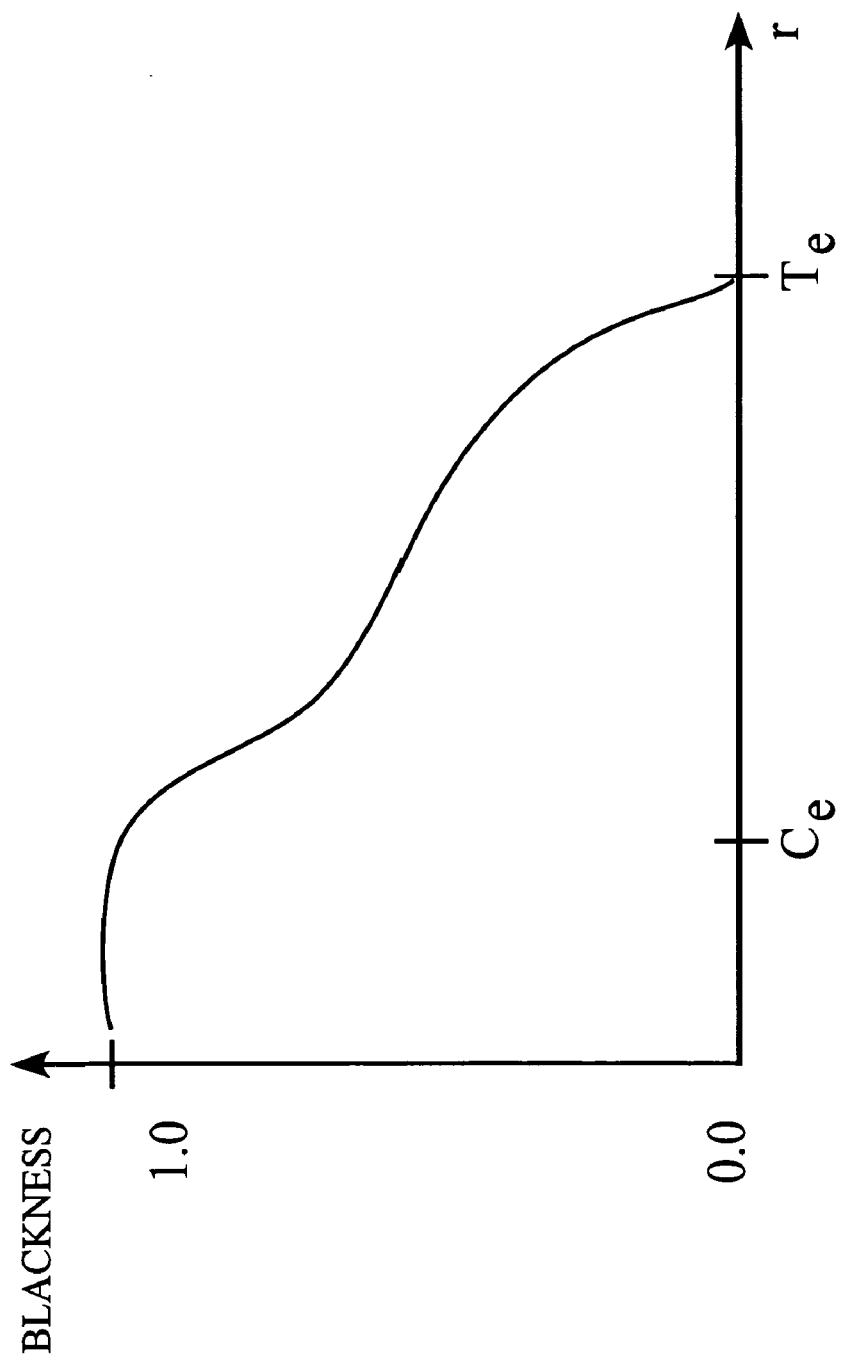

FIG. 6 is a graphical view of representative Cb versus Cr color values, showing a result of generating a key map in a bounded region of this color plane. For this example, a central region C (preferably convex) is black, indicating that a (foreground} pixel color within C is completely replaced by a corresponding (background) pixel color having its own color distribution. An annular region T immediately surrounding the center C is gray, indicating one or more transition regions where a pixel having a color within T is partly, but not completely, replaced by a corresponding background pixel. The remainder of the color plane in FIG. 6 is white, colorless or unmodified, with no full or partial replacement of a foreground pixel color by a corresponding background pixel color. The center region C and the transition region T need not be circular and/or annular and may have any reasonable shapes. FIG. 7 is a graphical view of a typical key, representing a pixel replacement index, which is 1.0 within the region C, for a color radius $r \leq C_e$, decreases monotonically within the region T, and is 0.0 for a color radius greater than second selected radius $T_e (\geq C_e)$.

The foreground key generation module (55 in FIG. 3, 105 in FIG. 5) produces a foreground key from the chrominance and luminance information for each pixel of the foreground video, normally using a lookup table. However, for a ten-bit component, this foreground key generation would require provision of about $2^{30}$ ($\approx 10^9$) memory addresses for a lookup table. If the luminance value is temporarily ignored, the required lookup table memory is reduced to about $2^{10}$. By confining the $2^{20}$ nonzero values of a foreground suppression key value to within a rectangular bounding box containing the chroma key color(s), as suggested in FIG. 6, the lookup table memory requirements may be further reduced to about $2^{17}$ addresses. By further assuming that the distribution of key values within the bounding box is continuous and involves only gradual changes in key values (no high spatial frequencies), the lookup table memory need only store down-sampled values, fewer in number than would otherwise be required. The key generation module determines a pixel's key value by (1) determining if the key is within a bounding box, (2) if no, the key is set to 100 percent foreground, and (3) if yes, the key value is interpolated based upon the "nearest" sample values stored in memory.

A foreground suppression module (53 in FIG. 3, 103 in FIG. 5) removes from the video image the chroma key color and partly removes any transition colors between the key color and the colors of the true image. This color removal is implemented by using the color key signal as an indicator of how much of the key color has been mixed to form the present key pixel value. For the key color itself, indicated by 0 percent foreground, the foreground suppression module will attempt to subtract a color vector from the key vector to produce a neutral color, such as black, gray or white. If, for example, (Cb, Cr)=(128, 128) is taken as the origin, the vector to be subtracted will extend from (128, 128) to a target key color (Cb(key), Cr(key)). For a key signal value that indicates 100 percent foreground, for example, no subtraction is performed. For an intermediate key vector value, a vector with a proportionally reduced length is subtracted.

Figure 8:
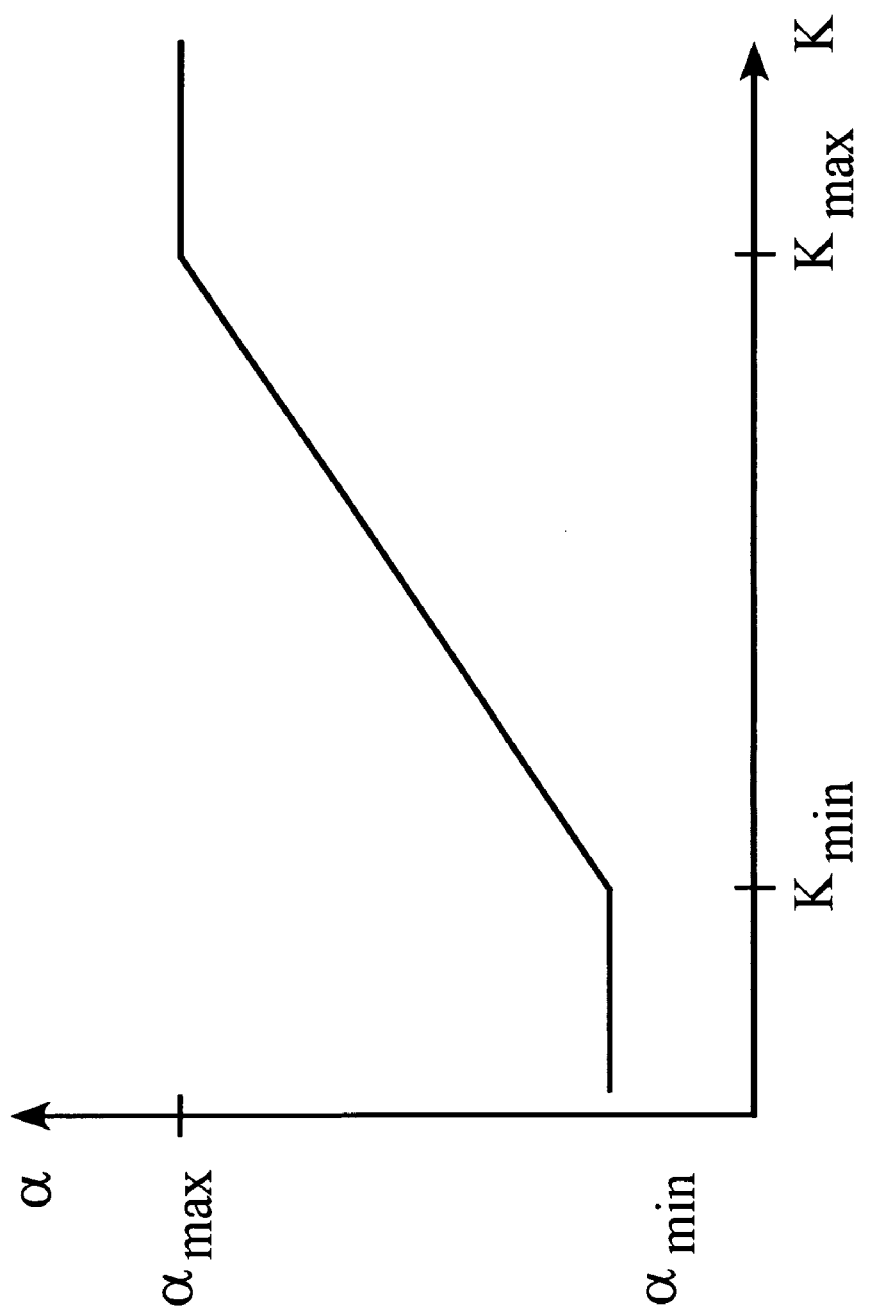
FIG. 8 is a graphical illustration of key value clipping and rescaling used in the invention.

A foreground key to alpha module (59 in FIG. 3, 113 in FIG. 5) modifies the foreground key so that the key can be used to define an alpha value to drive the alpha mixer module (63 in FIG. 3, 125 in FIG. 5). If an unmodified key is used to define the alpha value, some areas of key color transition, such as color spill or key color reflections from another surface, may become translucent, and the background video image may appear in inappropriate places. Optionally, the foreground key to alpha module (1) clips a key value K ($0 \leq K \leq 1$) below a lower threshold value $K_{min}$ and/or clips the key value above an upper threshold value $K_{max}$ and does not affect the key value between these two threshold values, as illustrated in FIG. 8, and/or (2) lowers and rescales the resulting mid-range of key values linearly to cover the full span of alpha values. A suitable set of defining equations for these two processes is $$\alpha 1 = f(\alpha) = 0.5\{|\alpha - \alpha_{min}| - |\alpha - \alpha_{max}| + (\alpha_{min} + \alpha_{max})\}, \quad (1)$$

$$\alpha 2 = g(\alpha 1) = (\alpha 1 - \alpha_{min}/(\alpha_{max} - \alpha_{min}) \quad (2)$$

The modified key value, $\alpha = K1$ or $\alpha = K2$, is the result of applying one or both of the two processes indicated in (1) and (2). Optionally, one of the processes in (1) and (2) can be applied by itself to produce a modified key value $\alpha$, if desired. By modifying the relation between the foreground key value and the alpha value, the affected background region (C, and possibly T, in FIG. 6) that the foreground subject fits into can be increased or reduced in size. The foreground subject remains the same size because the foreground suppression process has already reduced the outlying areas to black. Although an alpha mixer is used here, some control is retained over the background region, analogous to the control provided by a more complicated alpha mixer.

The shadow control (on/off) module (85 in FIG. 4, 107 in FIG. 5) determines whether shadow information is included in the foreground image video. Attention here focuses on provision of shadows in the background so that the foreground key signal is used to determine whether a given pixel is or is not a background pixel. Although transition colors are not, strictly speaking, part of a background pixel, the shadow mechanism may be activated to provide finer detail in these transition regions. If the foreground key value for a given pixel is below some adjustable level, shadow generation is not activated for that pixel. If the luminance value is below some adjustable level, which is preferably set below the average luminance of the key color background, and the foreground key level is above its required level, shadow generation will be activated for that pixel.

The shadow generation module (87 in FIG. 4, 109 in FIG. 5) produces a shadow strength signal based in part on the shadow on/off signal. If the shadow control signal FGSh is "off", the shadow strength is 0. The shadow signal is used to modify the alpha value. Because the background portions of the foreground video image have already been suppressed to "black" or to a darker hue, a shadow can be created in the composite image by mixing in more of the foreground color. The shadow strength may be added to the $\alpha$ value ($\alpha \rightarrow \alpha'$, with $\alpha \leq \alpha' \leq 1$), or subtracted from the $1-\alpha$ value ($\alpha \rightarrow \alpha'$, with $\alpha \leq \alpha' \leq 1$), where overflow and/or underflow are compensated for by clipping.

The alpha mixer (45 in FIG. 2, 63 in FIG. 3, 125 in FIG. 5) may be a standard module that receives an alpha value a, a first signal A and a second signal B and generates and issues a weighted sum, $\alpha \cdot A + (1-\alpha) \cdot B$, where $0 \leq \alpha \leq 1$.

Figure 9:
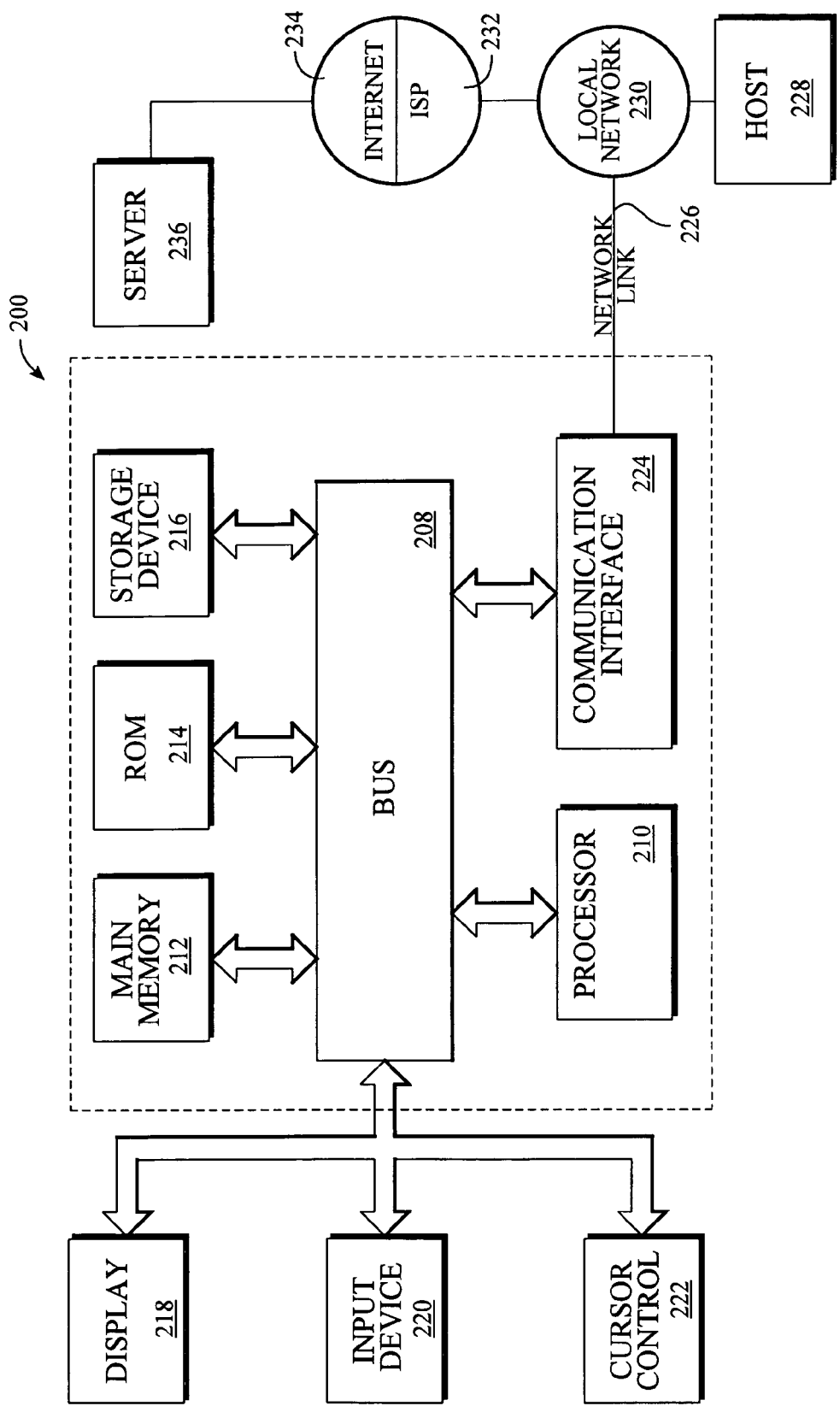
FIG. 9 is a schematic view of a computer system.

FIG. 9 shows a block diagram of a general computer system 200, which may be used to implement various hardware components of the invention, such as a client an applications server and a database management system. The computer system 200 includes a bus 208 or other communication mechanism for communicating information and a processor 210, coupled with the bus 208, for processing information. The computer system 200 also includes a main memory 212, such as a random access memory (RAM) or other dynamic storage device, coupled to the bus 208, for storing information and instructions to be executed by the processor 210. The main memory 212 also may be used for storing temporary variables or other intermediate information during execution of instructions by the processor 210. The computer system 200 further optionally includes read only memory (ROM) 214 or other static storage device, coupled to the bus 208, for storing static information and instructions for the processor 210. A storage device 216, such as a magnetic disk or optical disk, is provided and is coupled to the bus 208 for storing information and instructions.

The computer system 200 may also be coupled through the bus to a display 218, such as a cathode ray tube (CRT), for displaying information to a computer user. An input device 220, including alphanumeric and other keys, is coupled to the bus for communicating information and commands to the processor 210. Another type of user input device is a cursor control 222, such as a mouse, a trackball or cursor direction keys for communicating direction information and command selections to the processor 210 and for controlling cursor movement on the display 218. This input device typically has one degree of freedom in each of two axes, such as x- and y-axes, that allows the device to specify locations in a plane.

The functionality of the invention is provided by the computer system 200 in response to the processor 210 executing one or more sequences of instructions contained in main memory 212. These instructions may be read into main memory 212 from another computer-readable medium, such as a storage device 216. Execution of the sequences of instructions contained in the main memory 212 causes the processor 210 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 210 for execution. This medium may take many forms, including but not limited to non-volatile media, volatile media and transmission media. Non-volatile media includes, for example, optical and magnetic disks, such as the storage disks 216. Volatile media includes dynamic memory 212. Transmission media includes coaxial cables, copper wire and fiber optics and includes the wires that are part of the bus 208. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, papertape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

Various forms of computer-readable media may be involved in carrying out one or more sequences of one or more instructions to the processor 210 for execution. For example, the instructions may initially be carried on a magnetic disk of a remote computer. The remote computer can load the instructions into its dynamic memory and send the instructions over a telephone, using a modem. A modem local to the computer system 200 can receive data over a telephone line and use infrared transmitter to convert and transmit the data to the an infrared detector connected to the computer system bus. The bus will carry the data to the main memory 212, from which the processor receives and executes the instructions. Optionally, the instructions receive by the main memory 212 can be stored on the storage device 216, either before or after execution by the processor 210.

The computer system 200 also includes a communications interface 224, coupled to the bus 208, which provides two-way data communication coupling to a network link 226 that is connected to a local area network (LAN) or to a wide area network (WAN). For example, the communications interface 224 may be an integrated services digital network (ISDN) card or a modem to provide a data communication connection to a corresponding type of telephone line. As another example, the communications interface 224 may be a local area network card to provide a data communication connection to a compatible LAN. Wireless links may also be implemented. In any such implementation, the communications interface 224 sends and receives electrical, electromagnetic or optical signals that carry digital data streams representing various types of information.

The network link 226 typically provides data communication through one or more networks to other data devices. For example, the data link 226 may provide a connection through an LAN 228 to a host computer 230 or to data equipment operated by an Internet Service Provider (ISP) 232. The ISP, in turn, provides data communication services through the world wide packet data communication network, now commonly known as the "Internet" 234, served by one or more servers 236. The LAN 228 and the Internet 234 both use electrical, electromagnetic and/or optical signals to carry the digital data streams. The signals carried by these network, the signals carried on the network link 226 and the signals carried on the communications interface 224, are examples of carrier waves that transport the information.

What is claimed is:

1. Apparatus for formation of a composite video image, the apparatus comprising:
    a shadow control module that receives a foreground video image signal and generates a shadow key that identifies at least one selected pixel for which foreground shadowing is activated;
    a shadow generation module that receives the foreground image signal and the shadow key and generates and issues a foreground shadow signal FGSh, in which each selected pixel appears in a shadow format; and
    a shadowing module that receives the foreground shadow signal and a background video image signal BG and generates a modified background image signal, in which a foreground shadow is impressed on each selected pixel of the background image, wherein said shadowing module forms a sum signal $\beta \cdot FGSh+(1-\beta') \cdot BG$, as said modified background image signal, where $\beta$ and $\beta'$ are real numbers lying in a range [0,1], selected so as to limit either an intensity of the foreground shadow or an intensity of the background image, wherein $\beta$ is less than $\beta'$ thereby limiting the intensity of the background image.

2. An apparatus for formation of a composite video image, the apparatus comprising:
    a shadow control module that receives a foreground video image signal and generates a shadow key that identifies at least one selected pixel for which foreground shadowing is activated;
    a shadow generation module that receives the foreground image signal and the shadow key and generates and issues a foreground shadow signal FGSh, in which each selected pixel appears in a shadow format; and
    a shadowing module that receives the foreground shadow signal and a background video image signal BG and generates a modified background image signal, in which a foreground shadow is impressed on each selected pixel of the background image, wherein said shadowing module forms a sum signal $\beta \cdot FGSh+(1-\beta') \cdot BG$, as said modified background image signal, where $\beta$ and $\beta'$ are real numbers lying in a range [0,1], selected so as to limit either an intensity of the foreground shadow or an intensity of the background image, wherein $\beta$ is greater than $\beta'$ thereby limiting the intensity of the foreground shadow.

3. A method for formation of a composite video image, the method comprising:

receiving a foreground video image signal and generating a shadow key that identifies at least one selected pixel for which foreground shadowing is activated;

receiving the foreground image signal and the shadow key and generating and issuing a foreground shadow signal, FGSh, in which each selected pixel appears in a shadow format; and receiving the foreground shadow signal and a background video image signal BG and generating a modified background image signal, MBG, in which a foreground shadow is impressed on each selected pixel of the background image by forming a sum signal, $\beta \cdot FGSh + (1-\beta') \cdot BG$, as a modified background image signal, where $\beta$ and $\beta'$ are real numbers lying in a range [0,1], selected so as to limit either an intensity of the foreground shadow or an intensity of the background image, wherein $\beta$ is less than $\beta'$ thereby limiting the intensity of the background image.

4. A method for formation of a composite video image the method comprising:

receiving foreground video image signal and generating a shadow key that identifies at least one selected pixel for which foreground shadowing is activated;

receiving the foreground image signal and the shadow key and generating and issuing a foreground shadow signal, FGSh, in which each selected pixel appears in a shadow format; and receiving the foreground shadow signal and a background video image signal BG and generating a modified background image signal, MBG, in which a foreground shadow is impressed on each selected pixel of the background image by forming a sum signal, $\beta \cdot FGSh + (1-\beta') \cdot BG$, as a modified background image signal, where $\beta$ and $\beta'$ are real numbers lying in a range [0,1], selected so as to limit either an intensity of the foreground shadow or an intensity of the background image, wherein $\beta$ is greater than $\beta'$ thereby limiting the intensity of the foreground shadow.

5. An article of manufacture comprising:

a computer usable medium having computer readable code means embodied therein for producing a composite video image including portions of at least one foreground image and of at least one background image;

computer readable program code means for receiving a foreground video image signal FG and generates a shadow key that identifies at least one selected pixel for which foreground shadowing is activated;

computer readable program code means for receiving the foreground image signal and the shadow key and generating and issues a foreground shadow signal FGSh, in which each selected pixel appears in a shadow format; and computer readable program code means for receiving the foreground shadow signal and a background video image signal BG and generating a modified background image signal, in which a foreground shadow is impressed on each selected pixel of the background image by forming a sum signal $\beta \cdot FGSh + (1-\beta') \cdot BG$ as said modified background image signal, where $\beta$ and $\beta'$ are selected real numbers lying in a range [0,1], selected so as to limit either an intensity of the foreground shadow or an intensity of the background image, wherein $\beta$ is greater than $\beta'$ thereby limiting the intensity of the foreground shadow.

6. An article of manufacture comprising:

a computer usable medium having computer readable code means embodied therein for producing a composite video image including portions of at least one foreground image and of at least one background image;

computer readable program code means for receiving a foreground video image signal FG and generates a shadow key that identifies at least one selected pixel for which foreground shadowing is activated;

computer readable program code means for receiving the foreground image signal and the shadow key and generating and issues a foreground shadow signal FGSh, in which each selected pixel appears in a shadow format; and computer readable program code means for receiving the foreground shadow signal and a background video image signal BG and generating a modified background image signal, in which a foreground shadow is impressed on each selected pixel of the background image by forming a sum signal $\beta \cdot FGSh + (1-\beta') \cdot BG$ as said modified background image signal, where $\beta$ and $\beta'$ are selected real numbers lying in a range [0,1] selected so as to limit either an intensity of the foreground shadow or an intensity of the background image, wherein $\beta$ is less than $\beta'$ thereby limiting the intensity of the background image.

* * * * *